J. W. GIBBONS.
ROTARY MEASURING DEVICE.
APPLICATION FILED JAN. 25, 1917.
1,369,740.
Patented Feb. 22, 1921.
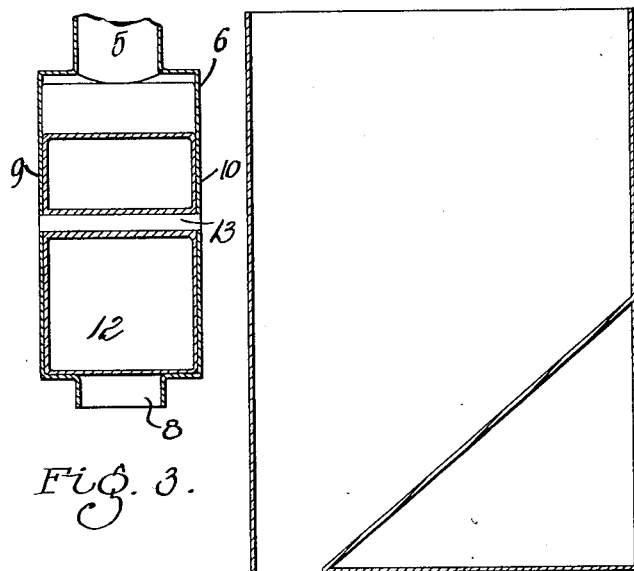
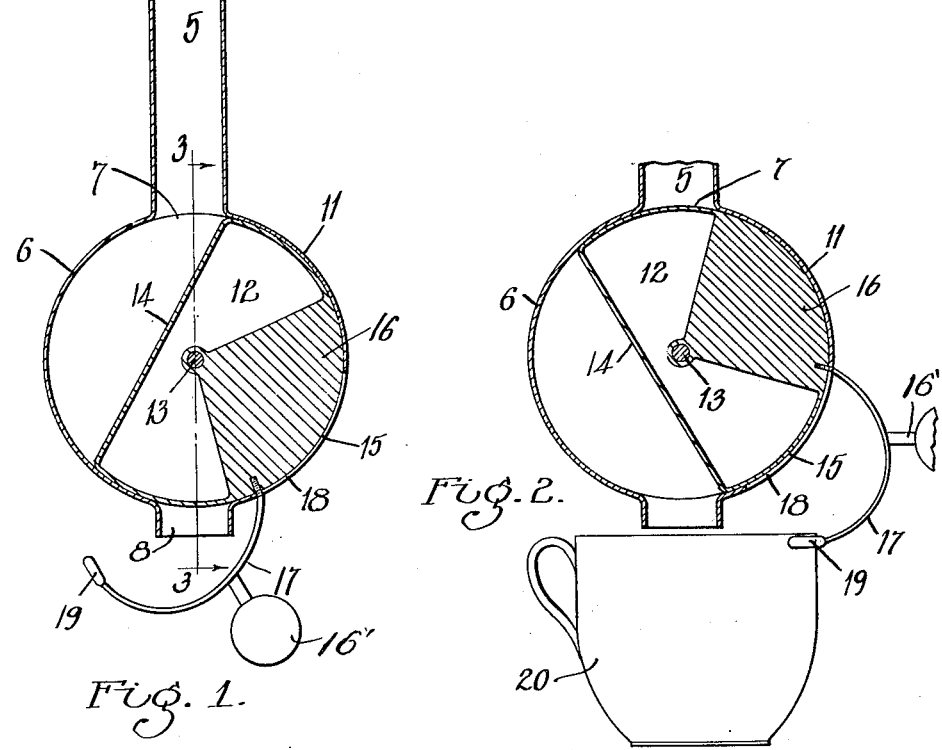

UNITED STATES PATENT OFFICE.

JAMES W. GIBBONS, OF BOSTON, MASSACHUSETTS.

ROTARY MEASURING DEVICE.

1,369,740.

Specification of Letters Patent.

Patented Feb. 22, 1921.

Application filed January 25, 1917. Serial No. 144,533.

*To all whom it may concern:*

Be it known that I, JAMES W. GIBBONS, a citizen of the United States, residing at Boston, in the county of Suffolk and State of Massachusetts, have invented new and useful Improvements in Rotary Measuring Devices, of which the following is a specification.

This invention relates to a measuring device which is particularly adapted to be used in restaurants known as "cafeteria" restaurants where the patrons help themselves to food and placing it on a tray then receive a cup of coffee or tea and help themselves to sugar for the coffee or tea. The tray containing the food being held in one hand, it is impossible to put the sugar in the coffee or tea without setting down the tray, and according to the present arrangement the patron is obliged to put down the tray and help himself to sugar for his coffee or tea.

It is the object of this invention to make it possible for the patron to hold the tray in one hand and with his cup of coffee in the other press against a certain portion of the measuring device of this invention and receive a certain amount of sugar which will be guided into the cup as it is held against the measuring device.

The invention consists in the combination and arrangement of parts set forth in the following specification and particularly pointed out in the claims thereof.

Referring to the drawings:

Figure 1 is a sectional elevation of my improved measuring device.

Fig. 2 is a sectional elevation similar to Fig. 1, but illustrating the valve in a different position and the container broken away to save space in the drawings.

Fig. 3 is a sectional elevation taken on line 3—3 of Fig. 1.

Like numerals refer to like parts throughout the several views of the drawings.

In the drawings, 5 is a container for material such as sugar, 6 is a stationary measuring cup fastened to said container and having an orifice 7 opening out of said container into said measuring cup. Said measuring cup also has an opening 8 opening out of the bottom thereof.

The measuring cup 6 is a hollow disk having two sides 9 and 10 and a cylindrical ring 11. A segmental valve 12 is rotatably mounted within the measuring cup 6 and has a pivot 13 supported upon the opposite sides 9 and 10 of the measuring cup. The valve 12 consists of a segmental disk having one straight side 14 and an arcuate side 15. The arcuate side 15 is in close proximity to the inner face of the cylindrical rim 11, but does not necessarily contact therewith.

A counterbalance 16 is inclosed within the segmental valve 12 and holds the same normally in the position illustrated in Fig. 1. An arm 17 is fastened to the counterbalance 16 and projects through a slot 18 provided in the rim of the measuring cup 6. Said arm projects beneath the opening 8 and terminates in a curved plate 19 and has an auxiliary counterweight 16' fastened thereto.

The general operation of the device hereinbefore specifically described is as follows: Assuming the parts to be in the relative positions illustrated in Fig. 1, a cup 20 is placed against the curved plate 19 and pushed backwardly or toward the right (Fig. 1) until the parts assume the relative positions illustrated in Fig. 2, that is, with the orifice 7 closed and the opening 8 open. At this time the sugar contained in the cup will flow down through the opening 8 and into the cup 20. As soon as the sugar has run out of the measuring cup, the user removes the cup 20 from contact with the plate 19 and the counterbalance 16 will carry the valve back to the position illustrated in Fig. 1, with the orifice 7 open and with the opening 8 closed, and the sugar will then flow from the container 5 into the space in the measuring cup which is not occupied by the valve 12.

Having thus described my invention, what I claim and desire by Letters Patent to secure is:

1. A device for measuring material having, in combination, a container for said material, a stationary measuring cup fast to said container consisting of a hollow disk having an orifice in its periphery opening out of said container into said measuring cup and having an opening in the bottom of said measuring cup and a valve journaled to rotate within said cup and comprising a segmental disk, the periphery of which is in close proximity to the inner face of the rim of said measuring cup and is of a length sufficient to close said orifice when said opening is open and vice versa, a counterweight, and an arm fast to said valve said arm projecting through a slot provided in the rim of said measuring cup whereby said valve may be normally positioned to simultaneously open said orifice and close said opening, said valve being at all times closed to the passage of said material thereinto.

2. A device for measuring material having, in combination, a container for said material, a stationary measuring cup fast to said container consisting of a hollow disk having an orifice in its periphery opening out of said container into said measuring cup and having an opening in the bottom of said measuring cup and a valve journaled to rotate within said cup and comprising a segmental disk, the periphery of which is in close proximity to the inner face of the rim of said measuring cup and is of a length sufficient to close said orifice when said opening is open and vice versa, a counterweight, and an arm fast to said valve, said arm projecting through a slot provided in the rim of said measuring cup, whereby said valve may be normally positioned to simultaneously open said orifice and close said opening, said arm normally projecting beneath said opening and a plate fast to the free end thereof whereby said valve may be rotated, said valve being at all times closed to the passage of said material thereinto.

3. A dispensing device having, in combination, a body with a discharge passageway therethrough, a valve member pivotally mounted in the body and disposed across said passageway, and a lever at one side of the body connected to the valve member for moving the latter and having a part extending laterally therefrom into proximity to the discharge end of the passageway, said valve member being adapted in one position to receive from one portion of the passageway a quantity of material to be dispensed, and in another position of the valve member to discharge such quantity of material into the other portion of the passageway, said lever being movable into the discharge position when said part is pressed laterally to one side of said discharge opening by a receptacle placed beneath the discharge opening.

4. A dispenser of the character described comprising a container having a discharge casing, a rotatable, cylindrical valve disposed transversely of the casing, said valve being formed in one face to constitute a measuring element and controlling the discharge from the container, and an actuating member extending outward from the valve and beyond the exterior of the discharge casing and urged to a position with its lower end disposed beneath the lower end of the discharge casing, said actuating member when shifted rearward rotating the valve to discharge the contents of the valve through the casing.

5. A dispensing device of the character described comprising a container having a contracted discharge neck; said neck being formed with a casing having a transversely extending, cylindrical bore, the bore being intersected by an upper aperture leading from the container, and a lower discharge aperture, one wall of the bore being formed with a vertical slot, a cylindrical valve disposed within said bore to rotate and having a portion cut away from its peripheral face to form a measuring element, and an actuating member extending from the valve through said slot and then extending downward at an angle and having a weight on its depending end, said weighted end of the actuating member being normally disposed beneath the discharge aperture of the neck and holding the valve with the measuring element in register with the aperture leading from the container, said actuating member when shifted shifting the valve to carry the measuring element into register with the discharge aperture at the lower end of the neck and thereby cutting off the discharge of material from the container.

6. A dispenser of the character described comprising a container having a discharge casing, a cylindrical measuring valve rotatably mounted in the casing, and an actuating device attached to the measuring valve and at all points being disposed exterior to the casing and having one end normally disposed below the lower end of the discharge casing, said actuating device when shifted carrying the measuring valve from a position where it receives material from the container into a position where it discharges material through the discharge casing.

In testimony whereof I have hereunto set my hand in presence of two subscribing witnesses.

JAMES W. GIBBONS.

Witnesses:
CHARLES S. GOODING,
SYDNEY E. TAFT.